(12) United States Patent
Saiz

(10) Patent No.: US 11,067,055 B2
(45) Date of Patent: Jul. 20, 2021

(54) SYSTEM FOR CAPTURING THE ENERGY OF FLUID CURRENTS

(71) Applicant: Manuel M. Saiz, Almeria (ES)

(72) Inventor: Manuel M. Saiz, Almeria (ES)

( * ) Notice: Subject to any disclaimer, the term of this patent is extended or adjusted under 35 U.S.C. 154(b) by 0 days.

(21) Appl. No.: 16/324,820

(22) PCT Filed: Aug. 30, 2017

(86) PCT No.: PCT/ES2017/000101
§ 371 (c)(1),
(2) Date: Feb. 11, 2019

(87) PCT Pub. No.: WO2018/029387
PCT Pub. Date: Feb. 15, 2018

(65) Prior Publication Data
US 2019/0178224 A1 Jun. 13, 2019

(30) Foreign Application Priority Data

Aug. 9, 2016 (ES) .............................. ES201600696
Feb. 15, 2017 (ES) .............................. ES201700136
Jun. 23, 2017 (ES) ............................ ES201700535U

(51) Int. Cl.
| | |
|---|---|
| F03B 13/10 | (2006.01) |
| F03D 1/06 | (2006.01) |
| F03B 13/22 | (2006.01) |
| F03B 13/12 | (2006.01) |
| F03B 17/06 | (2006.01) |

(52) U.S. Cl.
CPC .............. *F03B 13/10* (2013.01); *F03B 13/12* (2013.01); *F03B 13/22* (2013.01); *F03B 17/061* (2013.01); *F03D 1/06* (2013.01); *F05B 2210/11* (2013.01); *F05B 2220/706* (2013.01); *F05B 2240/243* (2013.01); *Y02E 10/30* (2013.01); *Y02E 10/72* (2013.01)

(58) Field of Classification Search
CPC ........ F03B 13/10; F03B 13/22; F03B 17/061; F03D 1/06; Y02E 10/721; F05B 2240/243; F05B 2250/25; F05B 2210/16
USPC ..................................................... 290/42, 53
See application file for complete search history.

(56) References Cited

U.S. PATENT DOCUMENTS 4,708,592 A * 11/1987 Krolick ................... F03D 13/20
416/176
4,850,798 A * 7/1989 Bailey ..................... F03D 13/20
416/11

(Continued)

FOREIGN PATENT DOCUMENTS

GB 2524331 A * 9/2015 .............. F03B 17/06

*Primary Examiner* — Charles Reid, Jr.
(74) *Attorney, Agent, or Firm* — Robert M. Schwartz

(57) ABSTRACT

A system for capturing the energy of fluid currents, using axial turbines with one free end and the other end fastened to a mechanical element or electric generator, characterized in that the turbines include coil springs, helically twisted plates or crossbeams, complete helical turbines with their shafts or just their blades, which capture the energy of wind or water, with their shaft or fastened end actuating an electric generator or mechanical system. In all cases the blades around the rotation axis of the turbines have an inclination such that they generate a torque in the same direction and the turbines are automatically oriented by the water or air currents, like weather vanes.

13 Claims, 15 Drawing Sheets

(56) References Cited

U.S. PATENT DOCUMENTS

| | | | | |
|---|---|---|---|---|
| 7,633,174 B1* | 12/2009 | Feiler | ............... | F03B 17/061 290/43 |
| 8,961,131 B2* | 2/2015 | Trayner | ............... | F03B 17/06 290/42 |
| 10,378,505 B2* | 8/2019 | Holm | ............... | F03B 17/06 |
| 2006/0233635 A1* | 10/2006 | Selsam | ............... | F03D 15/20 415/4.3 |
| 2006/0257241 A1* | 11/2006 | Eielsen | ............... | F03B 17/00 415/71 |
| 2007/0041823 A1* | 2/2007 | Miller | ............... | F03B 17/061 415/4.1 |
| 2012/0243994 A1* | 9/2012 | Saeed | ............... | F03D 3/062 416/88 |
| 2013/0071244 A1* | 3/2013 | Mertens | ............... | F03D 7/026 416/1 |
| 2013/0147199 A1* | 6/2013 | Zambrano | ............... | F03B 17/063 290/54 |
| 2015/0021917 A1* | 1/2015 | Sellers | ............... | F03D 9/25 290/52 |
| 2015/0063910 A1* | 3/2015 | Meltsov | ............... | F03B 13/264 405/21 |
| 2015/0337794 A1* | 11/2015 | Perrenoud | ............... | F03D 3/005 416/128 |

* cited by examiner

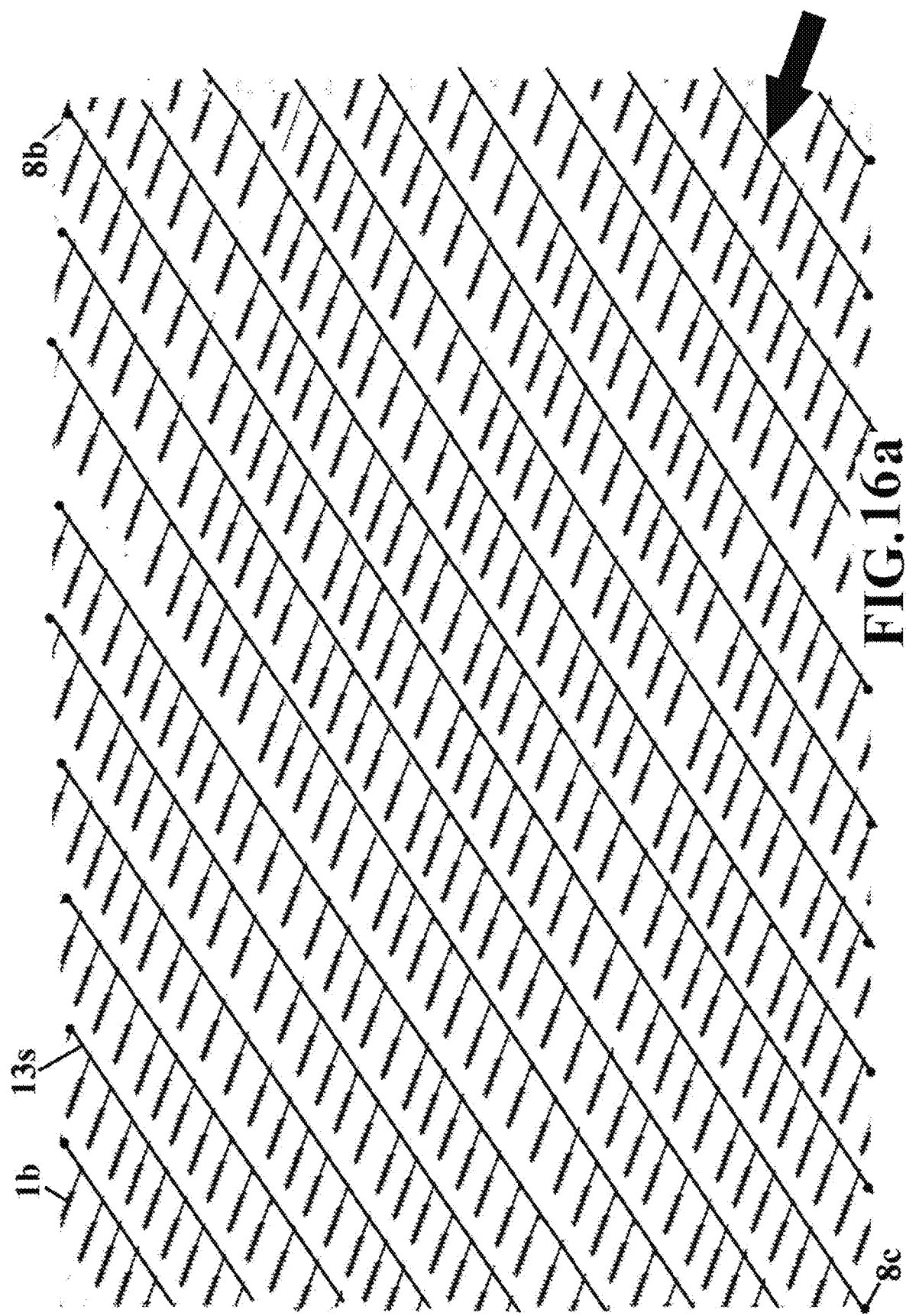

SYSTEM FOR CAPTURING THE ENERGY OF FLUID CURRENTS

CROSS REFERENCE TO RELATED APPLICATIONS

This application claims the benefit of PCT/ES2017/000101, filed Aug. 30, 2017, which claims the benefit of Spanish patent application number U201700535, filed Jun. 23, 2017, Spanish patent application number P201700136, filed Feb. 15, 2017, and Spanish patent application number P201600696, filed Aug. 9, 2016 the disclosure of which is incorporated herein by reference in their entirety.

BACKGROUND OF THE INVENTION a) Field of the Invention

Wind, river and sea energy collectors consisting of both mini and mega-systems which function to generate large amounts of electricity. Also for housing, agriculture, seawater desalination, water pumping, supplying power to the electricity network, obtaining hydrogen by electrolysis of the water and storage of pressurized air in bags in the sea at great depth.

b) Description of the Related Art

Water current energy harnessing systems in the sea need complex technologies and demand high expenditure to achieve optimum performance. They are hard to control, complex, need to be positioned in the direction of the currents and their energy is difficult to store.

Regarding wind systems, they need the latest technologies which are costly and the structures must be placed at high altitudes to take advantage of strong winds in order to achieve maximum efficiency. These are also intricate and difficult to manage and must be pointed towards the wind currents. As well as this, they have a negative visual impact on the landscape, produce radio interference, are prone to be struck by lightning which can result in birds being killed. As a result, this cost of this form of energy is more expensive than with conventional systems.

My invention attempts to eliminate the problems described above by providing a simple, useful and economical system through the use of axial blades, helical turbines and the like.

BRIEF SUMMARY OF THE INVENTION

The objectives of the invention and its advantages are:

To harness energy from sea and river currents, which, unlike solar and wind do not have large periods of calm, particularly in vast sea areas such as the Gulf Stream or Kuroshio, in straits, capes and around many islands, where large quantities of water flow at a rapid speed from one area to another.

To be able to use simple, low cost (can be between ten and thirty times cheaper) turbines which are high powered, high performance and have a minimal cost per kWh.

To facilitate the use of the smallest amount of parts i.e. single part, without shaft, without bearings, without supports, or to be anchored to the ground not needing masts where a nail or ballast is sufficient.

Emphasis on clean energy: Does not accumulate dirt, no need for covers or casing, useable in large and small dimensions or large length or in groups.

They can be inflatable and extendable, operate in line with or inclined towards the current, can be implemented for both air and water, does not harm wildlife, protects the ozone layer and the environment, is self-directing towards the wind or water currents without the need for electrical mechanisms.

Can be used submerged so as not to be affected by destructive waves, and through using constant currents, cutting out the need to have to store energy with this only being necessary in small amounts.

These qualities are unique to this system. No other current technology offers these features, the most useful and simple of which are the fact that it can be used free of shafts, blades, twisted beams or flat stocks.

Renewable energy is not yet efficient enough to use in large quantities, it is not constant, it causes environmental pollution, and, because of interruptions in the energy source, it needs to be stored. With the proposed system, large amounts of constant energy can be harnessed from seas and rivers without the need for storage, and can be placed where it does not harm or contaminate the environment either electrically, visually or audibly. With regard to wind power, it allows the harnessing of energy at high altitudes. Each turbine can use one or more helical threads or blades on its axis.

The system to harness wave energy consists of axial turbines which have one end free and the other held on its axis to a mechanical element which enables movement. Alternatively, this can also be attached to an electric generator, either directly or through an rpm multiplier.

The holding mechanism consists of a pair of links, an angular ball joint, a rod, a joint or a hinge. Generators and mechanical elements that are moveable are held by nails, anchors, concrete blocks, mesh bags filled with stones, posts, trees, towers, street lamps, buildings, mounds, or a cable or chain supported between two points of the aforementioned, which enable the turbines to rotate, orient themselves in the direction of the current and take advantage of the flow of the current. All this is possible because the turbines are comprised of helical springs, helically twisted beams or flat stocks, complete helical turbines with their shafts or only their blades, which can harness the energy of wind or water by driving its shaft or through a holding end connected to an electric generator system or a mechanical system or to a compressor or water pump, whose regulated flows drive motors or turbines that drive the generators.

In all cases, the blades around the axis of rotation of the turbines are always inclined to the wind, which generates a torque in the same direction. The generators only have a small angle of rotation or inclination. In one variant, turbines are formed by blade wheels connected in series.

All of the turbines can be cylindrical or conical in shape, and may use one or more blades or threads. The conical shape gives them more stability.

The turbines can have the same density as the current in which they move, or they may have different densities, whereby they may assume some inclination with respect to the fluidic current.

Turbines, their axes or blades besides being hollow and filled with helium or air, can be made of plastic polymer foam such as PVC, polyurethane, polyethylene, etc., with a strong and protective cover, and can act as kites. The axes or blades can also be made of rubber or plastic. They can be inflatable and flexible. In general, as they are in contact with water and with elements that can be abrasive, it is essential to use resistant and low density materials, polymers, and carbon or glass fibers with resins. When using metallic materials, like steel, they must have a protective layer of zinc. The plastic used can be reinforced with graphene and very resistant synthetic fibers such as Kevlar, glass, carbon, etc.

The turbine can be fixed to the collar, universal joint, ball socket, etc. In this case the shaft of the generator or the mechanical device is connected to the rotating end of the turbine by a pair of gears.

The turbines, when they do not have a shaft, consist exclusively of helical blades, helical springs, preferably in semi-circular or plane thread, or helically twisted beams or flat stocks. The helical flat thread springs match or are the same as the helical coils of turbines used without a shaft. The turbines, blades, helical plates or flat stocks have a performance proportional to their front or cross-section, to the angle it forms with the axis of rotation in each point and its length.

Angles between 25° and 55° can be used. Unlike turbines of this kind that move inside a conduit these can greatly increase its power by raising its length.

The blades can have two types of inclination:
a) Inclination of a section of the blade with respect to the axis of rotation
b) Inclination of a section of the blade with respect to a plane perpendicular to the axis of rotation.

Maximum performance is obtained at roughly 42° angles.

Especially in the air, the cables can be replaced by a long and simple helical turbine.

The electric generators can be synchronous, consisting entirely of permanent magnets. Especially rare earth materials such as samarium-cobalt or neodymium-iron-boron.

As mechanical elements, motor pumps are used to raise water or to drive electric generators, or air can be pressurized and stored in bags in the sea at great depth.

The turbines should preferably be axial to receive the flow of water or air parallel to their axes enabling changes of direction similar to that of weather vanes, but they may also have an inclination to the horizontal, which depends on the difference between the weight of the turbines, including the contiguous installation, generator, and the weight of the fluid that is displaced. When both factors are the same they remain horizontal in the fluidic current. Any type of turbine, with or without a shaft, may be used, especially those which are extended longitudinally and with inclined or helically arranged tilted blades. In order to increase their stability, their aerodynamic profiles have the dimensions of the turbines, their shafts and/or their blades are greater at or towards the free end.

An axial turbine variant utilizes, with or without shaft, two (or more) inclined blades that can be symmetrical to each other, which create a rotation torque about this shaft.

With the turbines inclined in the direction of the current, the efficiency can be enhanced as the section of the affected surface is much larger than with the frontal current. As well as this, the turbines, when they receive the current parallel to their axis, because they are not covered by a tube, also experience an increase in performance with the resultant power multiplied with respect to their length as downstream the turbine absorbs or captures laterally the energy of the water stream.

The rotation of several of these turbines can be applied to a shaft supported and driven through the inside of a mast which can then drive a pump drawing water from wells.

It is also possible for the turbines to have the free end attached to a balloon or to a buoy.

The turbines can act partially as balloons or floats. In all cases, the turbines, cables, chains, generators or retainer bars have a density equal to or similar to the medium in which they move. They may have a density between 70% and 130% of that of the fluid, although this is not limited.

The hollow and flexible turbines, shafts or blades can be made of canvas, plastic or very dense mesh, which act as bags and can be kept inflated with the air or water stream in which they are immersed. For this purpose the end of the turbine, which is fastened, carries a fluid inlet mouth delimited by a ring, which is held to the generator rotor shaft by means of cords.

The turbines can be placed in an orderly way, in rows and columns, so that they can utilize common electrical or water installations over a large area.

The blades can be rigid or flexible. Tilting the flexible blades and reducing their impact area helps to increase their speed.

Some turbines anchored at the sea floor can be turned and raised for repair or maintenance. It may be necessary to vary the degree of flotation through remote control to enable them to rise to the surface. This is achieved with the help of an air chamber, which expands for ascent and compresses for descent.

In the sea, the turbines can be placed semi-submerged to take advantage of the currents of the water and the wind.

To transport the current you can use a single conductor cable, the positive or phase of it is alternating and the opposite for the negative, using the water that is conductive.

The turbines can carry a floating rope, which is used to raise the system for repair or maintenance. A certain color is used to make it distinctive in the sea.

On land and in water the posts or buoys which use red or amber stroboscopic LED lights are supplied with energy generated from the system.

Particularly in high-altitude wind turbines, one or multiple turbines can be used in series instead of the holding cable.

Small-sized turbines spin very quickly and do not need multipliers. The mechanical energy obtained can be used to draw water on land where it is stored and subsequently used to drive a turbine that moves an electric generator.

The generator is held to a support point by a bar and a joint and a collar that allows it to tilt slightly vertically and horizontally, but not to rotate around its axis. This is also achieved with a pair of links.

Radial blades help prevent oscillations caused by turbulence or gusting winds.

Generators can supply heating resistors, power mobile phones, etc. resulting in a simple and very economical system.

A control, warning and security system informs about the status of each of the devices.

The weight of the turbine and moving parts is balanced with the upward displacement of the water or air being discharged keeping the turbine horizontally positioned, except when the stream of water or air has a certain vertical inclination. However, if we want it to be tilted upwards by having its supports on the ground, or tilted downwards when they are near the surface, the weight of the turbine must be altered to achieve this. You can use turbines which are more or less the same density as the fluid, resulting in inclination which has minimal effect on the very high performance level. This may be necessary in order to avoid disrupting the navigation of ships, airplanes, etc.

It is accordingly an object of the invention to harness wave and wind energy having at least one axial turbine with a density of between 70% and 130% of that of the current in which it is moving with one end of the turbine free, and the other end attached to a mechanical element to drive the turbines in order to harness the energy of the wind or water. In all cases the blades around the axis of rotation of the turbines have such an inclination that they generate a torque in the same direction. The generators only have a small angle of inclination and the turbines are automatically redirected in the direction of the water flow or air currents in a similar fashion to that of a weather-vane. A means to hold the generator to fixing elements, which allow the turbines to rotate and redirect themselves in the same direction as the current whilst harnessing and taking advantage of the current. The possibility to be controlled remotely with devices. Poles protruding from the water or buoys which are used as safety devices emitting red or amber LED strobe lights which are powered by the system. A means to transport electric power.

In accordance with another feature of the invention, the turbines are flat or semi-circular thread coil springs.

In accordance with an added feature of the invention, the turbines are helically twisted beams (12c, 12v).

In accordance with an additional feature of the invention, the turbines are complete helical turbines (1, 1a, 1b, 1d, 1m, 1p).

In accordance with another mode of the invention, the turbines are complete helical turbines with their shafts (13, 13c, 13v).

In accordance with an additional further mode of the invention, the turbines are only their blades or vanes (3a, 3b, 3c, 3v).

In accordance with yet an additional feature of the invention, the element to drive is an electrical generator (4).

In accordance with still another feature of the invention the element to drive is a mechanical system, compressor and water pump, whose flow regulated, drive engines and turbines which in turn drive the generators.

In accordance with another mode of the invention, the turbines are hollow and filled with foam of plastic polymers, polyurethane, polyethylene or PVC, coated with a protective and resistant layer.

In accordance with another added feature of the invention, the turbines have the free end attached to a balloon or a float.

In accordance with an additional feature of the invention low-density materials are used, based on steel, zinc, concrete, polymers, carbon fibers, glass or kevlar with resins, steel with a protective layer of zinc, reinforced with graphene and synthetic fibers.

In accordance with another feature of the invention, the turbines, their shafts, blades or vanes, are hollow and made of canvas, and are kept inflated with the air or water stream in which they are immersed, for which the end of the turbine, which is secured, carries an inlet of the fluid delimited with a ring (88), which is held to the generator rotor.

In accordance with another mode of the invention, the turbines, their shafts and the helical blades are flexible.

In accordance with yet an additional feature of the invention, the blades of the flexible turbines are inclined and reduce their impact surface with increasing wind or water velocity.

In accordance with still another feature of the invention a portion of the blades (3v) forms an angle ($\alpha$) with respect to the axis of rotation of between 25° and 55°.

In accordance with another mode of the invention, a portion of the blades (3v) forms an angle ($\beta$) of between 0 and 45° with respect to a plane perpendicular to the axis of rotation.

In accordance with yet an additional feature of the invention, the turbines take a cylindrical outer shape.

In another feature of the invention, a fluid current energy capture system utilizing axial turbines having a density between 70% and 130% of that of the fluid in which it is moving, having one free end, and the other or its axis, is attached to the mechanical element to be moved or to an electric generator, directly or through a rpm multiplier, these in turn are held by a pair of links, an angular pivot, a rod or a hinge to elements of holding nails, anchors, concrete blocks, mesh bags filled with stones, posts, trees, towers, street lamps, buildings, mounds, or a cable or chain supported between two points of the aforementioned, which allow the turbines to rotate, orienting itself in the fluid stream and capturing and taking advantage of the flow of the stream, having control, warning and safety devices, characterized in that the turbines comprise coil springs (10c), helically twisted beams (12c, 12v), complete helical turbines (1, 1a, 1b, 1d, 1m, 1p) with their shafts (13, 13c, 13v) or only their blades or vanes (3a, 3b, 3c, 3v), which capture the energy of the wind or water, driving its axis or holding end to an electrical generator system (4), to a mechanical system, compressor or water pump, whose flows regulated, of the latter two, drive to some engines or turbines that drive the generators, in all cases, the blades around the axis of rotation of the turbines, have such an inclination, that they generate a torque in the same direction, the generators only have a small angle of rotation or inclination, the turbines are automatically oriented with the flow of water or air currents like a weather-vane.

In accordance with another feature the coil springs have the blade or flat thread and do not have a shaft.

In accordance with yet another feature the coil springs are formed by a half-cane blade (90c), with the concavity towards the front zone.

In accordance with still another feature the axial turbines are of radial vanes and consist of several wheels of vanes.

In accordance with another mode the turbines (50) are formed by pairs of inclined triangular blades (51) distributed about their axis of rotation (52).

In accordance with still another mode the turbines (53) are formed by pairs of inclined triangular blades (54) distributed around their axis of rotation of shaft (55) and secured to their vertices with cables (56).

In accordance with yet another mode the turbines (60) are formed by two inclined blades (61) one on each side of the axis of rotation (62), being secured between two crank-shaped part (63 and 63a) one at each end, one of them being attached by cables or cords to the generator or to a metal element.

In accordance with another feature the shaft of the turbines 13 is solid.

In accordance with still another feature the shaft of the turbines is hollow and filled with helium or air.

In accordance with yet another feature the shaft of the turbine is hollow and is filled with foam of plastic polymers, polyurethane, polyethylene or PVC coated with a protective and resistant layer, acting as comets.

In accordance with still another mode the blades or turbines are flexible.

In accordance with another feature the blades or turbines are rigid.

In accordance with yet another feature the vanes, blades or shafts of the turbines are inflatable.

In accordance with still another feature the turbines are placed in orderly rows and columns.

In accordance with yet another mode the turbines have the free end attached to a balloon or to a float.

In accordance with another feature the turbines serve as warning or safety devices, posts protruding from the water or buoys are used, and red or amber strobes, preferably from LEDs, are applied.

Further the turbines are formed by multiple turbines in series or one of great length.

Additionally, low-density materials are used, based on steel, zinc, concrete, polymers, carbon fibers, glass or Kevlar® a registered trademark of Dupont, with resins, steel with a protective layer of zinc, reinforced with graphene and synthetic fibers.

In accordance with another feature, the rotational movement is applied to the electric generators to which they are attached or through multipliers of rpm.

In accordance with yet another feature generators of multiple pole pairs are used.

In accordance with still another feature the turbines, their shafts, blades or vanes, hollow, flexible, are made of canvas, and are kept inflated with the air or water stream in which they are immersed, for which the end of the turbine, which is secured, carries an inlet of the fluid delimited with a ring (88), which is held to the generator rotor or cable by means of cords (89).

In accordance with another mode the vanes or blades of the flexible turbines are inclined and reduce their impact surface with increasing wind or water velocity.

In accordance with yet another mode, motor pumps are used as mechanical elements to raise water.

In accordance with still another feature the turbines, their shafts or the helical blades are hollow inflatable and flexible.

In accordance with still another mode the helically twisted flanges, beams or flanges (126) act simultaneously as turbines and as holding cables.

In accordance with yet another mode the helically twisted blades or beams (126a) acting simultaneously as turbines and as holding cables, drive pumps inside a cylindrical shells 76, for which it has its lower end supported by bearings 75, raising the water during its rotation and exiting through an elbow conduit 78.

In accordance with still another feature the electric generators are synchronous and totally permanent magnets, mainly of rare earths of samarium-cobalt or neodymium-iron-boron.

In accordance with still another feature the turbines take a cylindrical outer shape.

In accordance with still another feature the turbines assume a conical external shape.

In accordance with still another feature the turbines have the same density as the fluid in which they move.

In accordance with yet another feature the turbines have densities different from that of the fluid.

In accordance with another feature the turbine is attached to a ball socket (6r), and the axis of the generator or mechanical device is connected to the rotating end of the turbine by a pair of gears (49r).

In accordance with yet another feature the electric generators are connected to a mobile telephone.

In accordance with still another feature the electric generators are connected to electric heating resistors.

It is further accordingly an object of the invention to provide a fluid current energy capture system for capturing energy from a fluid having an axial turbine having an axis of rotation, the turbine having a free end, and a fixation end opposite the free end, the turbine having a helical blade for being driven by the fluid, the blade having an inclination for generating a torque and rotating the turbine about the axis of rotation, a generator affixed to the fixation end, the generator generating power by rotation of the turbine driven by the fluid, and a base, the generator being rotatably mounted to the base for orientating the turbine in a flow stream of the fluid.

BRIEF DESCRIPTION OF THE DRAWINGS

FIGS. 7a and 7b show schematic and cross-sectional views of two helical blades.

FIGS. 16 and 16a show schematic views of a turbine field.

DESCRIPTION OF THE PREFERRED EMBODIMENTS

Figure 1:
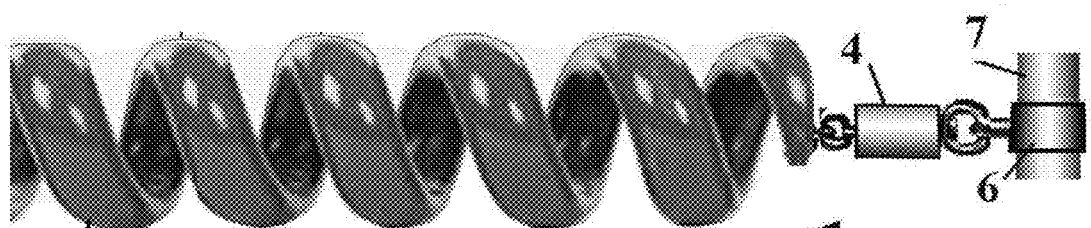
FIG. 1 shows a schematic, partial and side view of a helical spring type turbine, a generator and a holding mode.

FIG. 1 shows an depiction of a turbine of the invention, formed by a coil spring (10c), which has its end held to the axis of the electric generator (4). The generator is held by means of rings to the collar (6), in turn connected to the mast (7), so that it allows it to be tilted or turned horizontally and vertically slightly, but not to rotate around said rings.

Figure 1A:
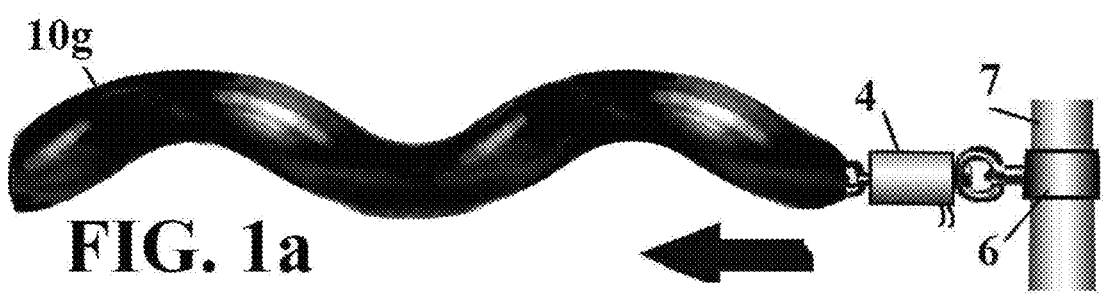
FIG. 1a shows a schematic, partial and side view, variant of a stretched helical spring type turbine, a generator and a holding mode.

FIG. 1a shows the turbine formed by a stretched helical spring portion (10g), which has its end held to the axis of the electric generator (4). The generator is held by means of rings to the collar (6), in turn connected to the mast (7), so that it allows it to be tilted or to rotate horizontally and vertically slightly but not to rotate around said rings.

Figure 1B:
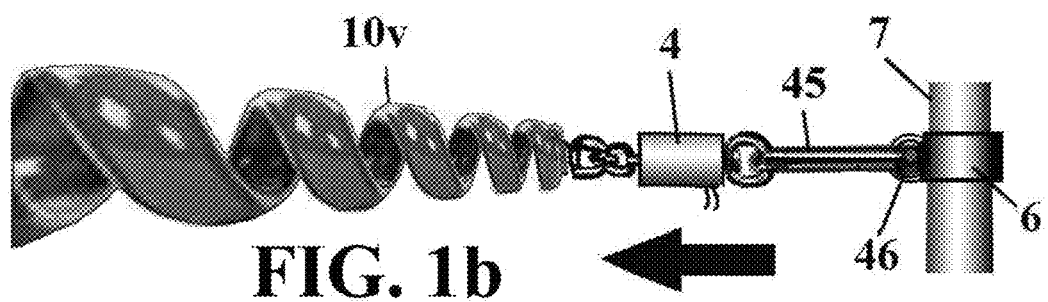
FIG. 1b shows a schematic, partial and side view, variant of a stretched helical spring type turbine, a generator and a holding mode.

FIG. 1b shows the turbine formed by a conical coil spring (10v), which has its end held to the axis of the electric generator (4). The generator is held by the rod (45) hinged with the hinge (46) to the collar (6) of the mast (7) so that it allows it to be tilted or turned horizontally and vertically slightly but not to rotate about the axis of said mast bar.

Figure 1C:
FIG. 1c shows a schematic, partial and side view of a helical spring-type turbine with the thread or blade in the form of a semi-circle, a generator and a holding mode.

FIG. 1c shows the turbine formed by a spring, half-cane blade (90C), the end of which is held to the generator (4). The generator is held by means of rings to the collar (6), in turn connected to the mast (7), so that it allows it to be tilted or rotated horizontally and vertically, slightly but not rotating about said rings.

Figure 2:
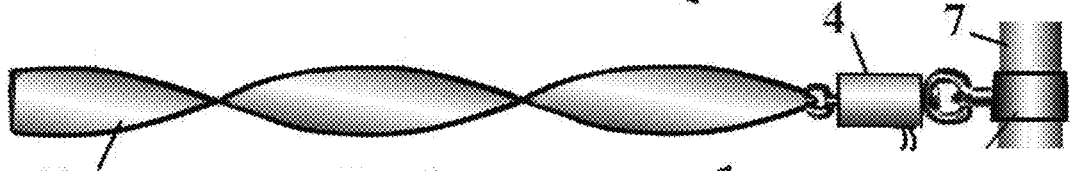
FIG. 2 shows a schematic, partial and side view, variant of a twisted beam or flat stock turbine, a generator and a holding mode.

FIG. 2 shows a turbine formed by a single twisted, helical and shaftless beam or flat stock (12c), which has its end held to the shaft of the electric generator (4). The generator is held by means of rings to the collar (6), in turn connected to the mast (7), so as to allow it to rotate horizontally and vertically, slightly, but not to rotate around said rings. This beam may also be hollow.

Figure 2A:
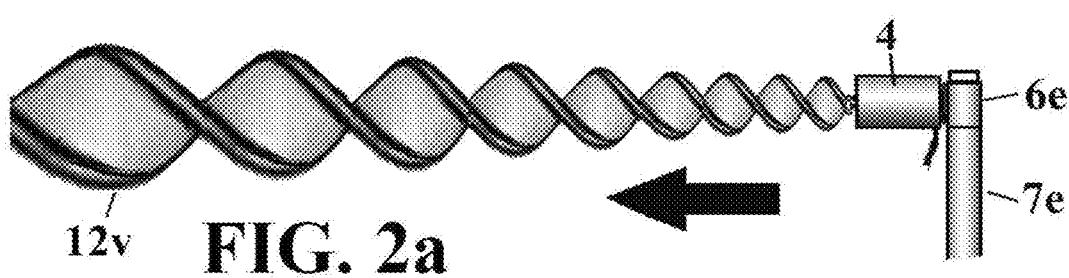
FIG. 2a shows a schematic, partial and side view, variant of a twisted beam or flat stock turbine, a generator and a holding mode.

FIG. 2a shows a shaftless turbine formed by a twisted and conical, helical beam (12v), which has its end held to the shaft of the electric generator (4). The generator is held by the rotatable collar (6e) and this to the post (7e), so that it allows to tilt or rotate horizontally and vertically, slightly, but not to rotate around the collar. This beam may also be hollow.

Figure 3:
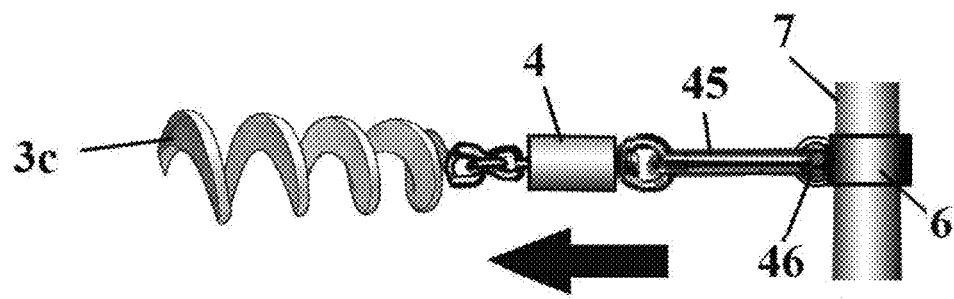
FIG. 3 shows a schematic, partial and side view, variant of a helical blade turbine, a generator and a holding mode.

FIG. 3 shows a turbine formed by a helical blade 3c and without a shaft, which has its end held to the shaft of the electric generator (4). The generator is held by the rod (45) hinged with the hinge (46) to the collar (6) of the mast (7) so that it allows to be tilted or turned horizontally and vertically, but not to rotate about the axis of said rod.

Figure 3A:
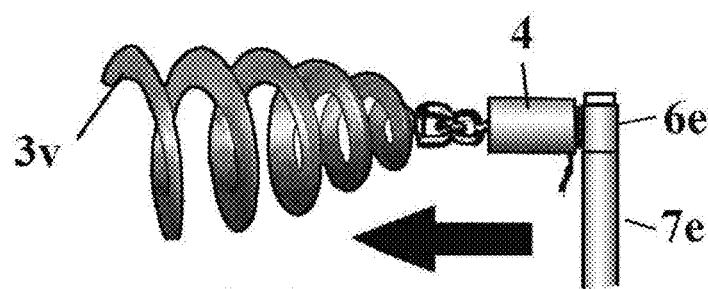
FIG. 3a shows a schematic, partial and side view, variant of a helical and spiral blade turbine, a generator and a holding mode.

FIG. 3a shows a turbine formed by a single conical helical blade 3v without a shaft, which has its end held to the shaft of the electric generator (4) and this to the collar (6) of the mast (7) that allows it to rotate vertically and horizontally and only allows a slight twist.

Figure 3B:
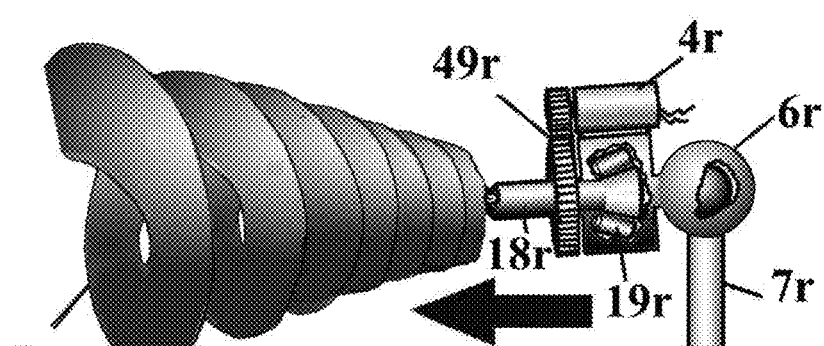
FIG. 3b shows a schematic, partial and side view, variant of a conical helical blade turbine, a generator and a holding mode.

FIG. 3b shows a single-blade, helical and conical turbine (3v), which has its end held to an outer shaft (18r) that drives the electric generator (4r), by the gears (49r) and is secured with the cylindrical bearings (19r), which are fixed in turn to the ball socket (6r) supported by the mast (7r), which allows the assembly to tilt horizontally and vertically but not to rotate about the axis (18r).

The turbines of FIGS. 3, 3a and 3b are similar to the springs FIGS. 1, 1a and 1b with flat blade or thread.

Figure 4:
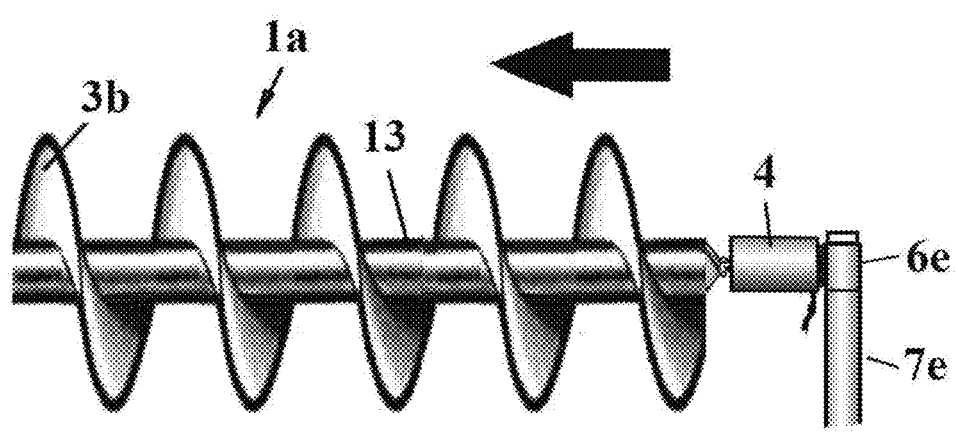
FIG. 4 shows a schematic, partial and side view of a helical turbine with shaft, a generator and a holding mode.

FIG. 4 shows a turbine formed by the helical blade (3b) on the shaft (13), which has its end held to the shaft of the electric generator (4). The generator is held to the rotatable collar (6e) on the mast (7e) so that it allows to tilt horizontally and vertically but not to rotate about the axis of said bar, only the small turning allowed by the links.

Figure 5:
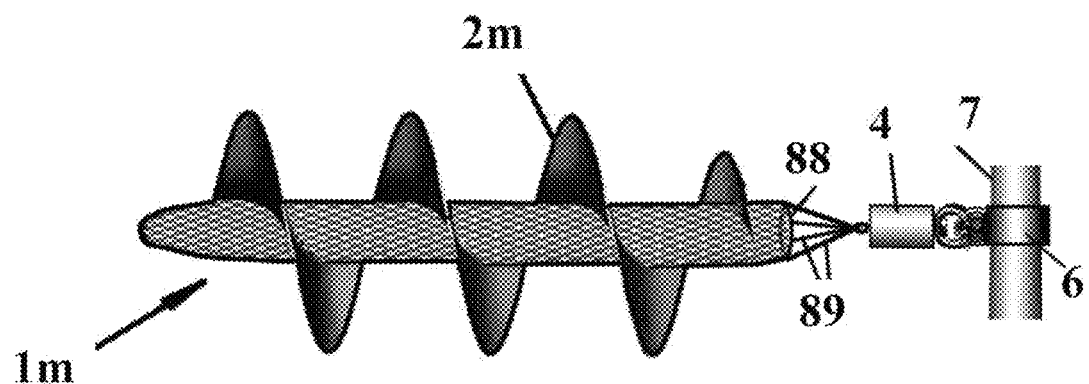
FIG. 5 shows a schematic and side view, variant of a turbine whose shaft or drum is formed by a very thick canvas or mesh.

FIG. 5 shows the turbine (1m) with the helical blade (2m). Which inflates with the flow of the stream of water or air, by which it carries a inlet with a ring (88), which is held to the shaft of the generator (4) with the cords 89. The generator is fixed and rotates horizontally with respect to the mast (7) with the collar (6). This inflation system is valid for all devices used herein. A railing may be added to prevent solid products from entering.

Figure 6:
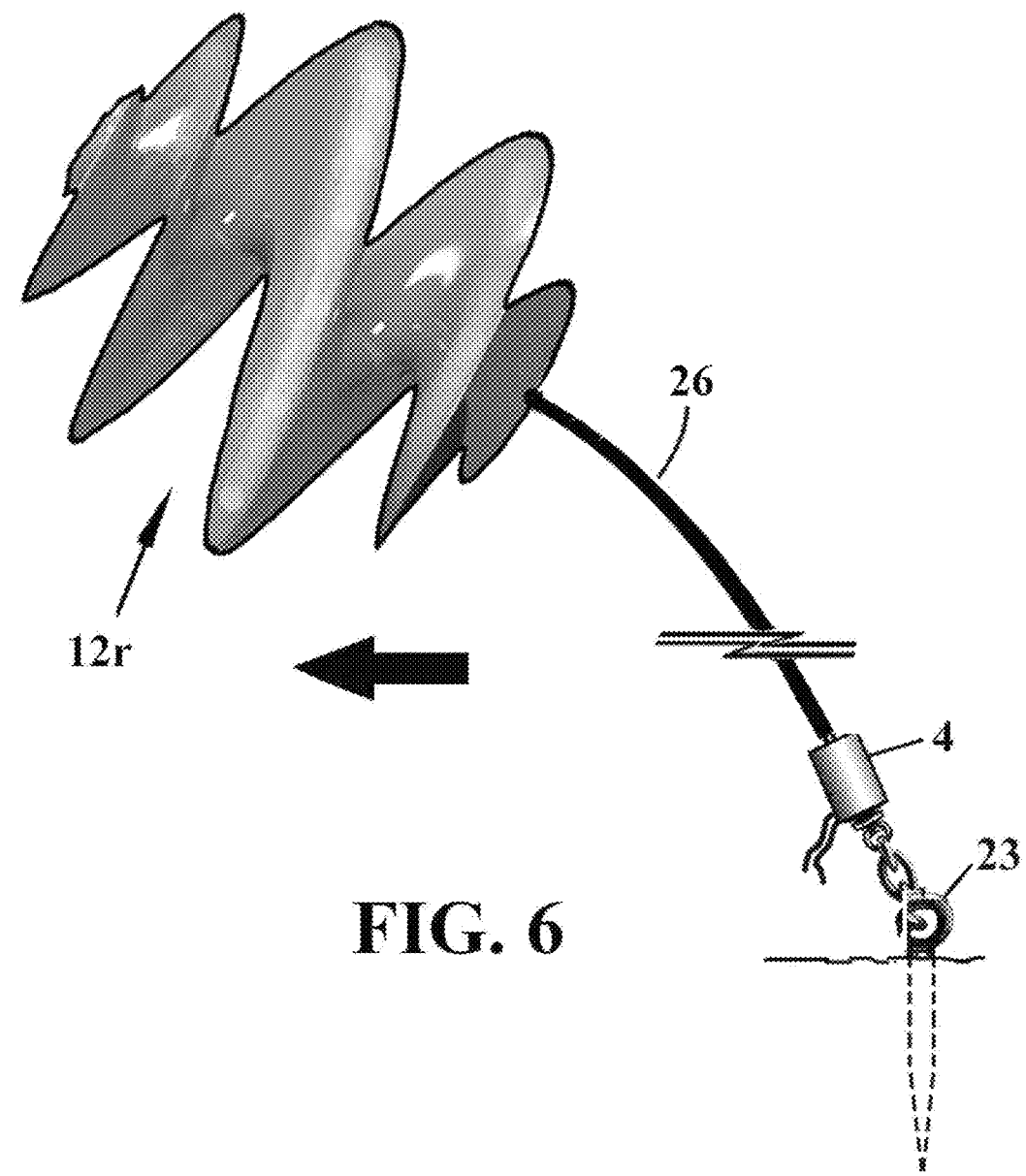
FIG. 6 shows a schematic and side view, variant of a helical turbine used in the air at high-altitude.

FIG. 6 shows a hollow turbine (12r) which may be a float in the water or a balloon filled with helium in the air, which may also act as a kite, so that once it is raised it is maintained by the action of the wind or water. It rotates the generator shaft of the generator (4) and is secured to the ground by the cable (26) and a nail (23). It has the advantage, as with all wind turbines of this type, to be able to rise and take advantage of the large currents of air prevalent at high altitudes. The cable must be electrically grounded to prevent static or lightning strikes.

Figure 7:
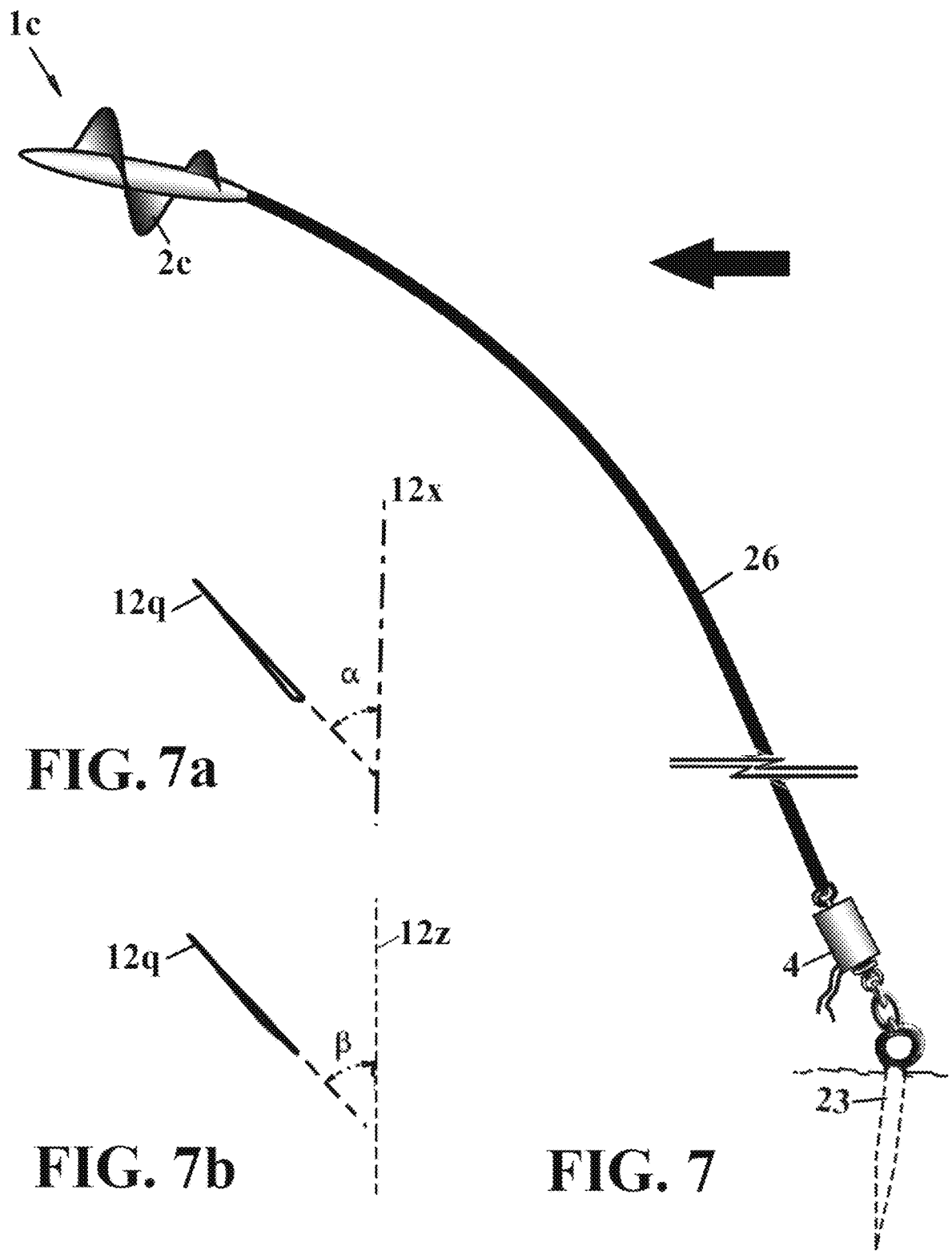
FIG. 7 shows a schematic and side view, variant of a turbine with a helical blade, used in air at high altitude.

FIG. 7 shows a hollow turbine (1c) with its blade (2c) which can be a float in the water or a balloon in the air, which can also act as a kite, so that once it has been lifted it remains airborne with the wind. It turns the generator shaft of the generator (4) and is secured to the ground by the cable (26) and a nail (23). It has the advantage, if used with winds, to be able to rise and take advantage of the large currents of air prevalent at high altitudes. The cable or rope shows the inclination you can take depending on the current flow and buoyancy. The cable or rope must be routed to earth to prevent static or lightning strikes.

FIG. 7a shows a helical blade (12q) forming the angle ($\alpha$) with the axis of rotation (12x) of the turbine.

FIG. 7b a helical blade (12q) forming the angle ($\beta$) with a plane perpendicular to the axis of rotation (12z) of the turbine.

Figure 8:
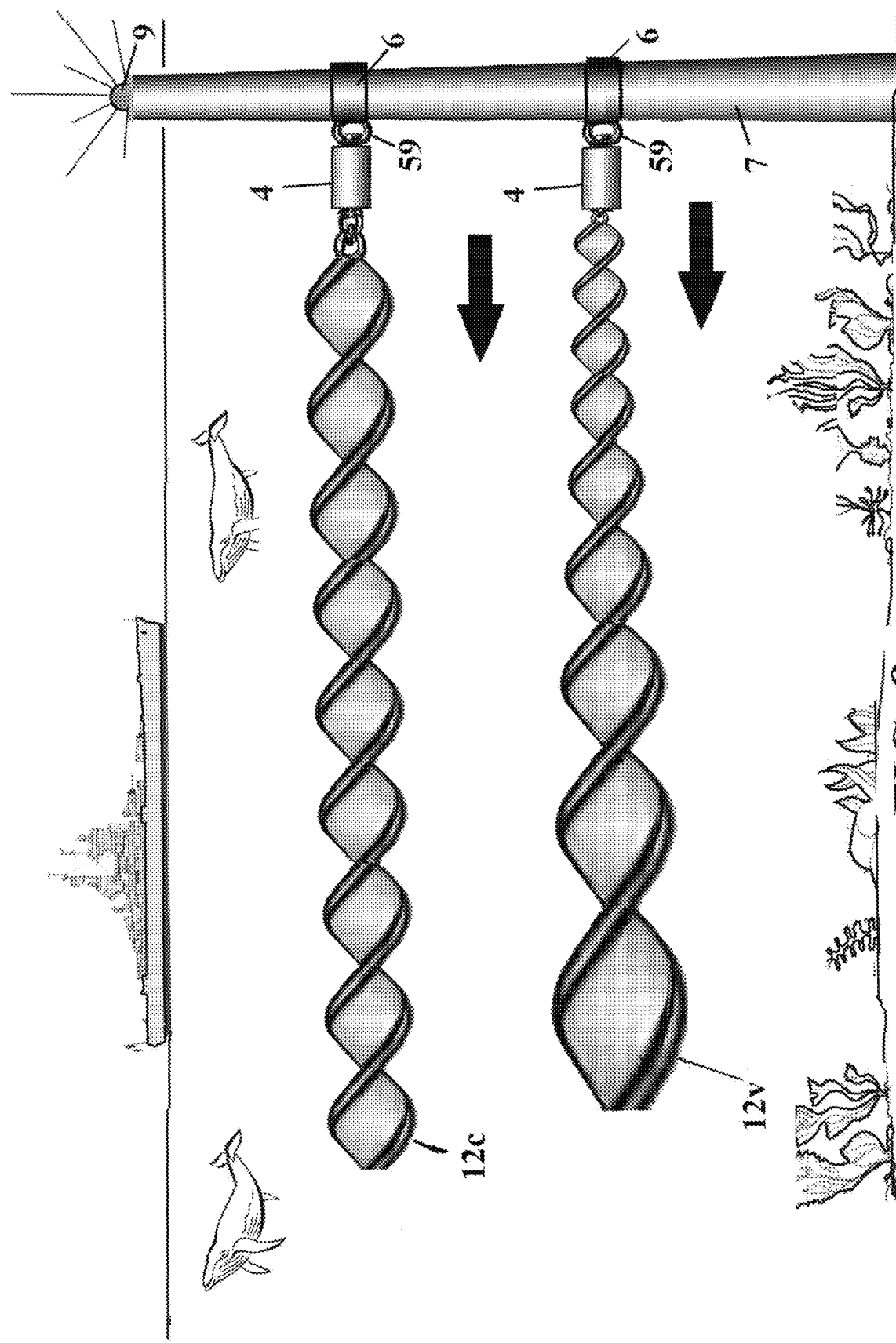
FIG. 8 shows schematic views of two twisted beams or flat stock turbines.

FIG. 8 shows turbines formed by helically twisted axial beams or flat stocks, the upper cylindrical (12c) and the lower (12v) conical. They drive electric generators (4) held to the mast (7) by means of the links (59) and the collar (6). A strobe light (9) at the end of the mast alerts you to its presence.

Figure 9:
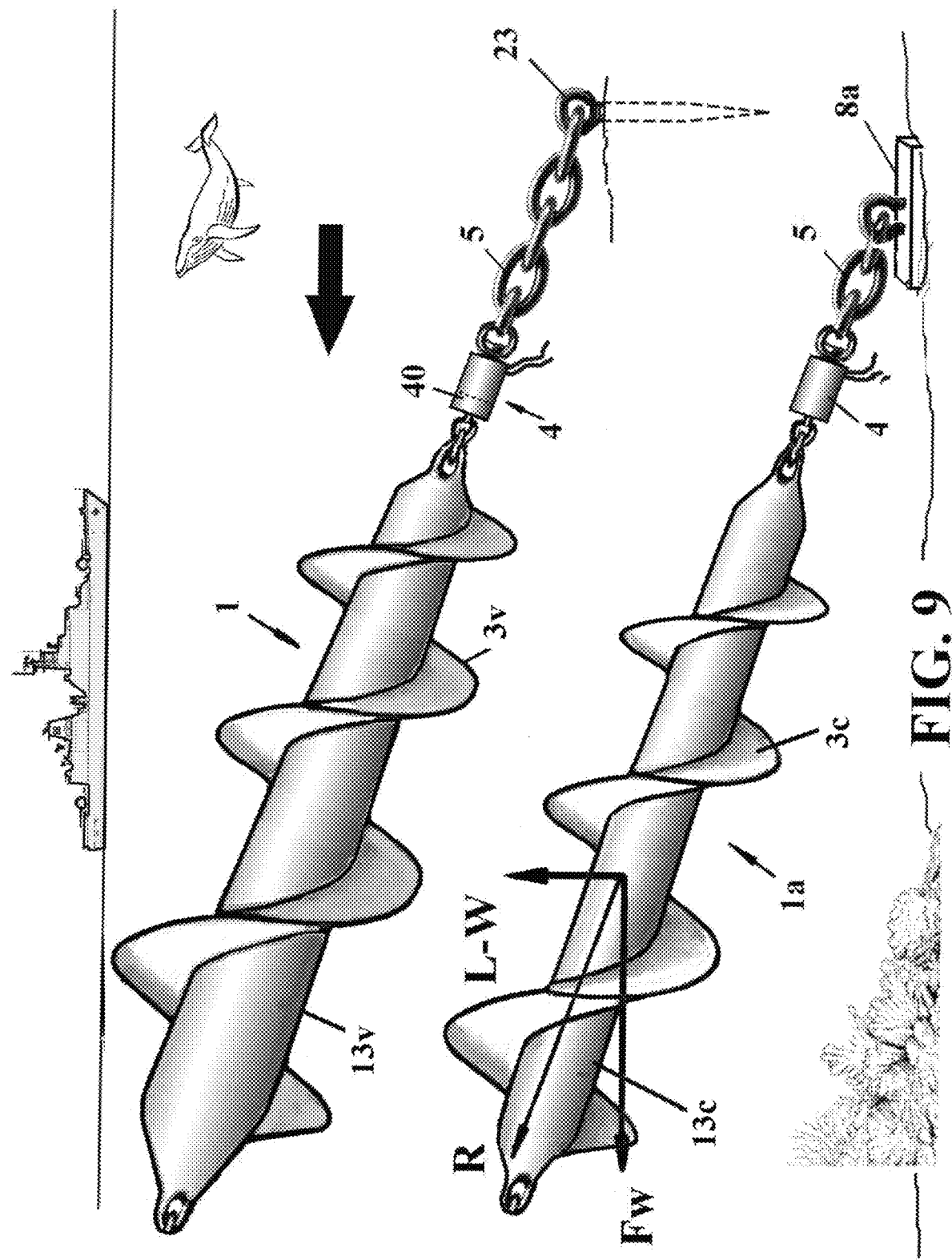
FIG. 9 shows schematic views of two complete turbines with shaft.

FIG. 9 shows two helical axial turbines (1) and (1a) whose hollow axis, the truncated-cone shaft (13v) and cylindrical shaft (13c), which gives them buoyancy, can float or remain submerged, can be flexible and formed by several lengthwise hinged sections (5), its axis is oriented in the direction of the water flow as a blade and drives an electric generator (4), air compressor or hydraulic pump. The upper one is fixed to the ground by means of a nail (23) and the lower one with the concrete block (8a) on the seafloor, rotating helical blades (3v) and (3c), which may be flexible, cause movement of the collector. They take advantage of both wind power and water currents. Both blades increase in size towards the loose end. Changing the density of its elements enables it to be used in the air. The lower turbine shows how the forces, direction and inclination are applied, as a function of the difference LW (lift force minus the upward thrust equal to the weight of the fluid volume in which it is immersed). Resulting in the force R and with the inclination shown therein.

Figure 10:
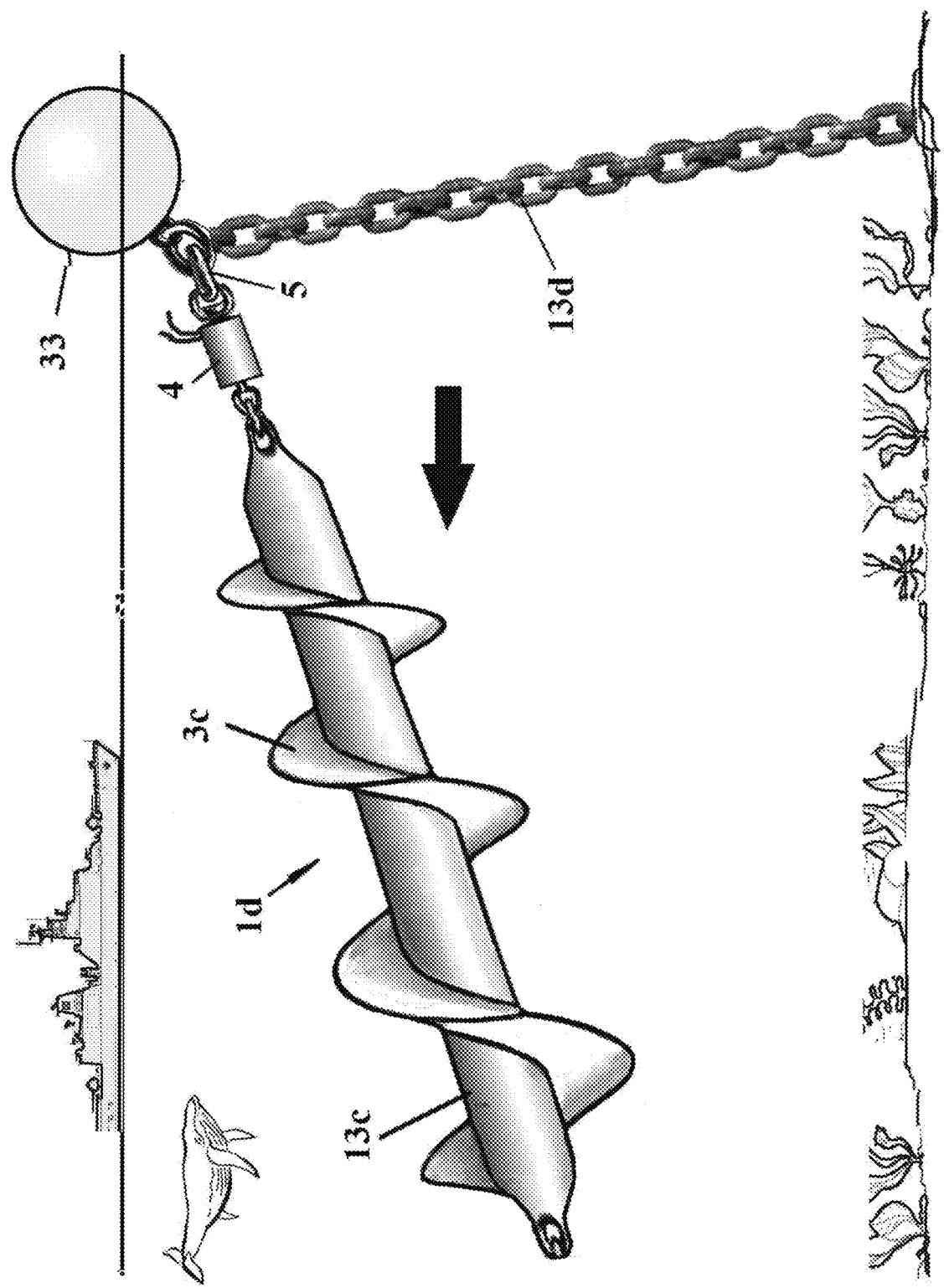
FIG. 10 shows a schematic view of a complete turbine with shaft.

FIG. 10 shows the helical turbine (1d) of hollow cylindrical shaft (13c) with increasing dimensions of the shaft and of the blade (3c) towards the free end. The holding end is held to the shaft of the generator (4) and the generator with the links (5) to a buoy (33) which is supported by the chain (13d) anchored at the bottom of the sea or river.

Figures 11, 11A:
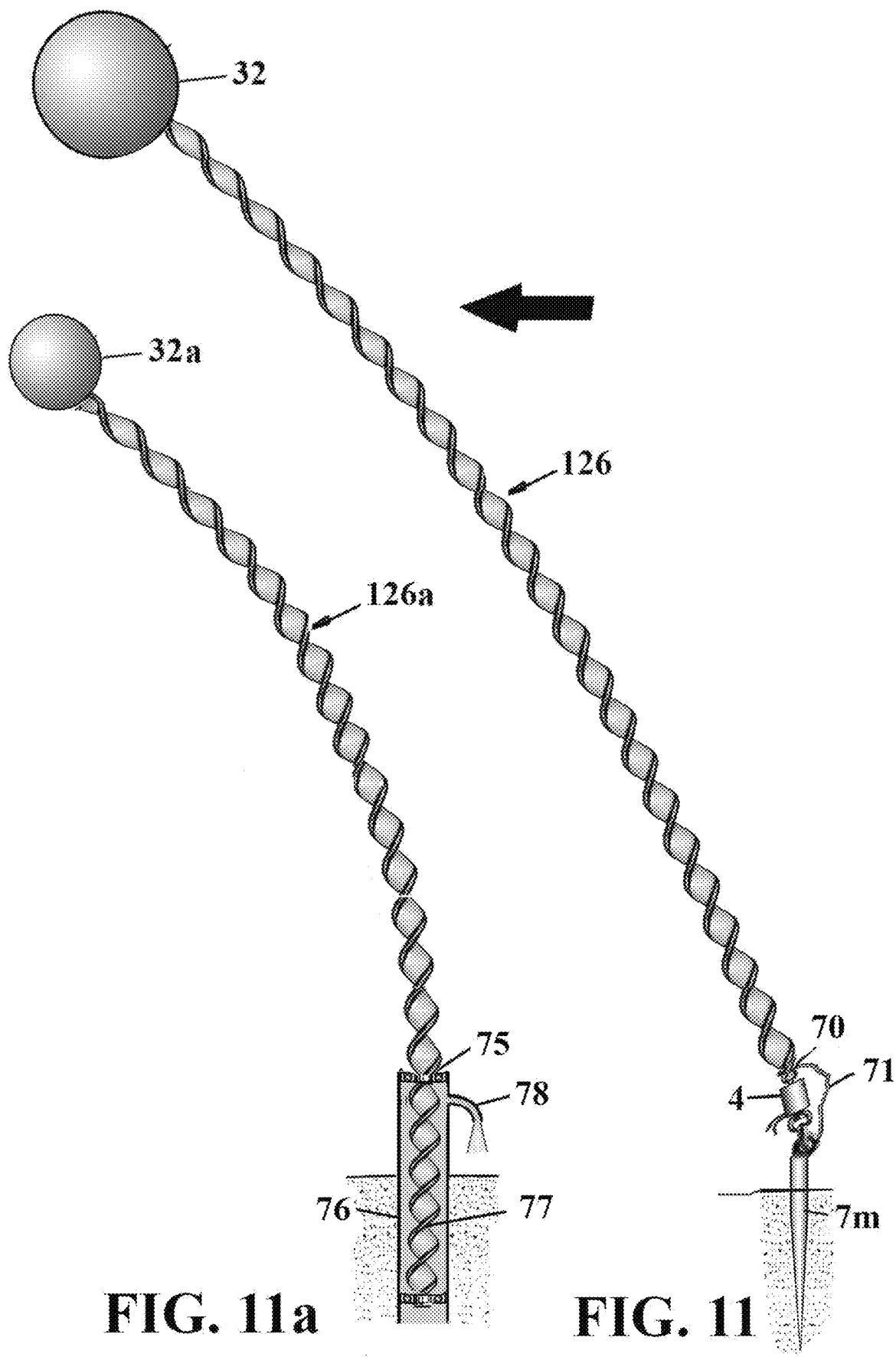
FIG. 11 shows a schematic view of a turbine actuated as a cable.
FIG. 11a shows a schematic view of a turbine which acts as a cable and a pump.

FIG. 11 shows the torsion beam turbine, that in addition acts as a cable, and its upper end is suspended by the balloon (32) and the lower is held to the generator (4) and this in turn to a nail (7m). The lead wire (71) derives the static current from the slide collar (70) to the nail (7m).

FIG. 11a shows the twisted beam turbine (126a), suspended from its upper end by the balloon (32a) and the turbine section (77) with the casing (76) acting as a pump as well as a cable. The ends of the turbine section (77) are supported with the bearings (75). The water flows through the faucet (78).

Figure 12:
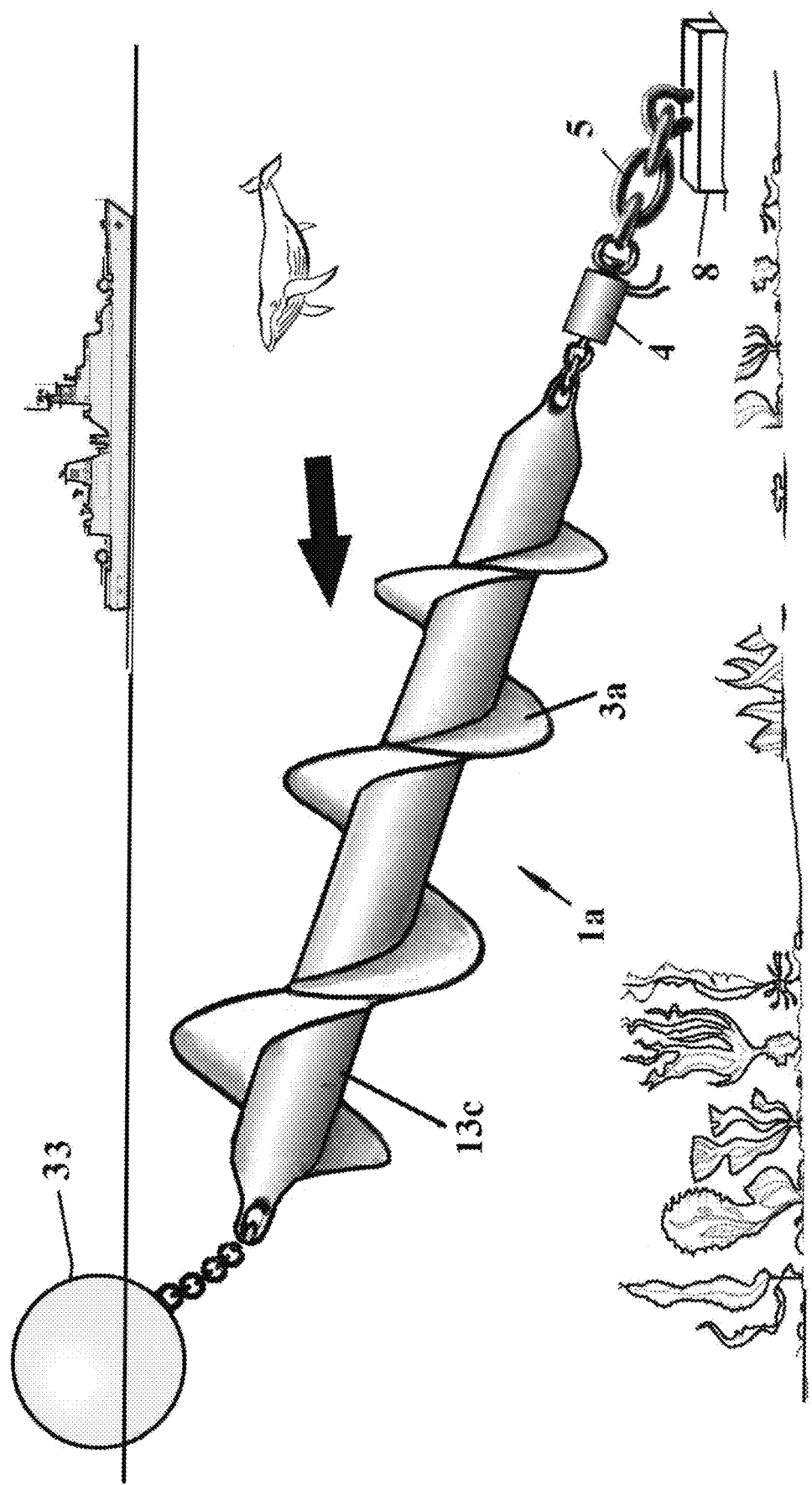
FIG. 12 shows a schematic view of a complete turbine with shaft.

FIG. 12 shows a helical axial turbine (1a) which can float or remain submerged by the buoy (33). It can be flexible and be formed of several longitudinally articulated sections, oriented in the direction of the water current as a weather vane and is held and drives the electric generator (4), and the links (5), to the concrete block (8). The rotating blade (3a) facilitates movement of the turbine. The turbine shaft (13c) is hollow and provides a high degree of flotation. In this case the buoy increases the buoyancy of the turbine. The flap increases its dimensions towards the end opposite the one held to the concrete block.

Figure 13:
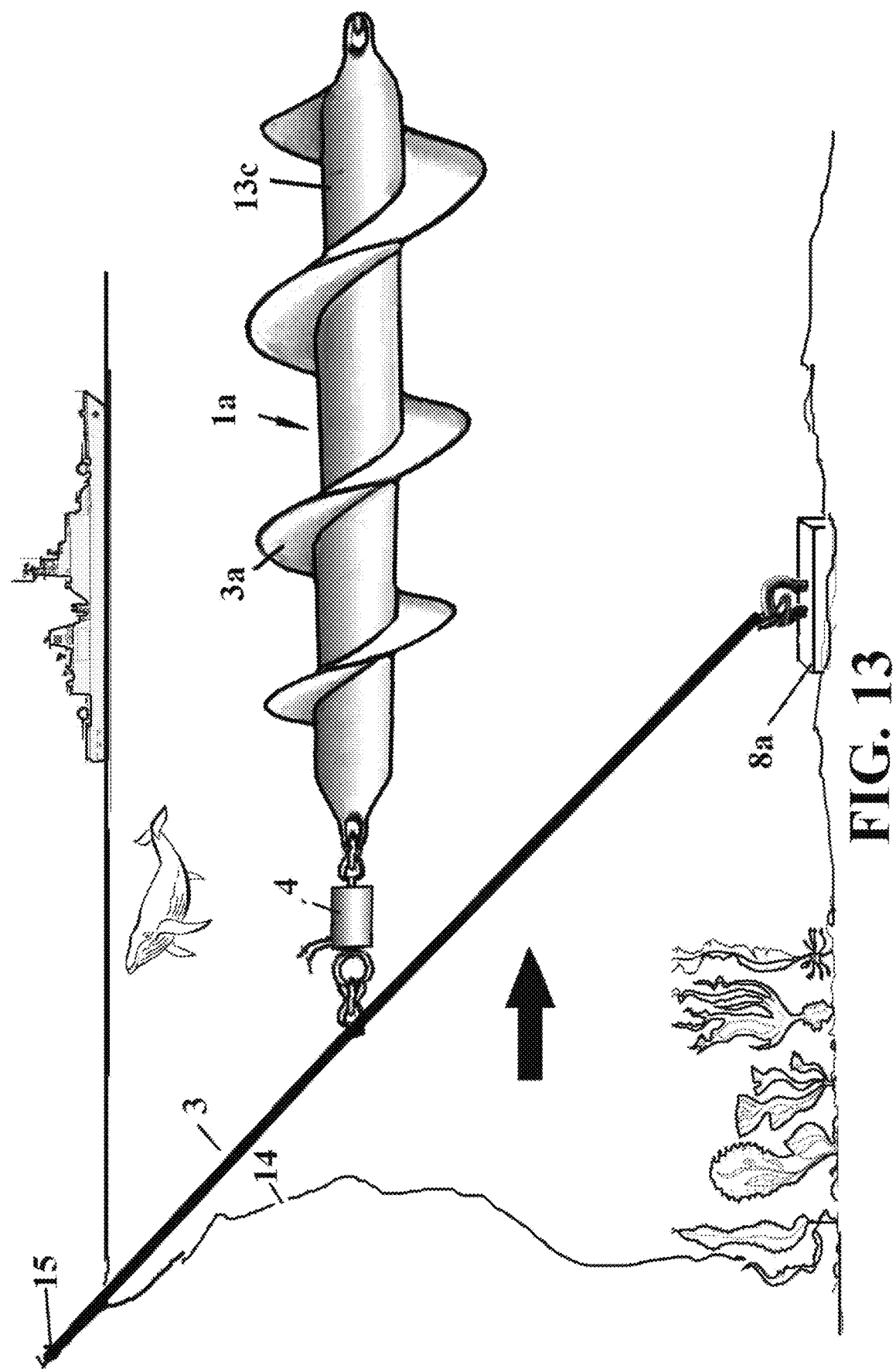
FIG. 13 shows a schematic view of a complete turbine with shaft.

FIG. 13 shows the helical turbine (1a) held to the shaft of the electric generator (4) which is held to the cable (3) which can be a chain, held at one end (15) to a cliff (14) and the other to a concrete block (8a) at the bottom of the sea. The turbine has a hollow cylindrical and float shaft (13c) and a helical blade about it (3a).

Figure 14:
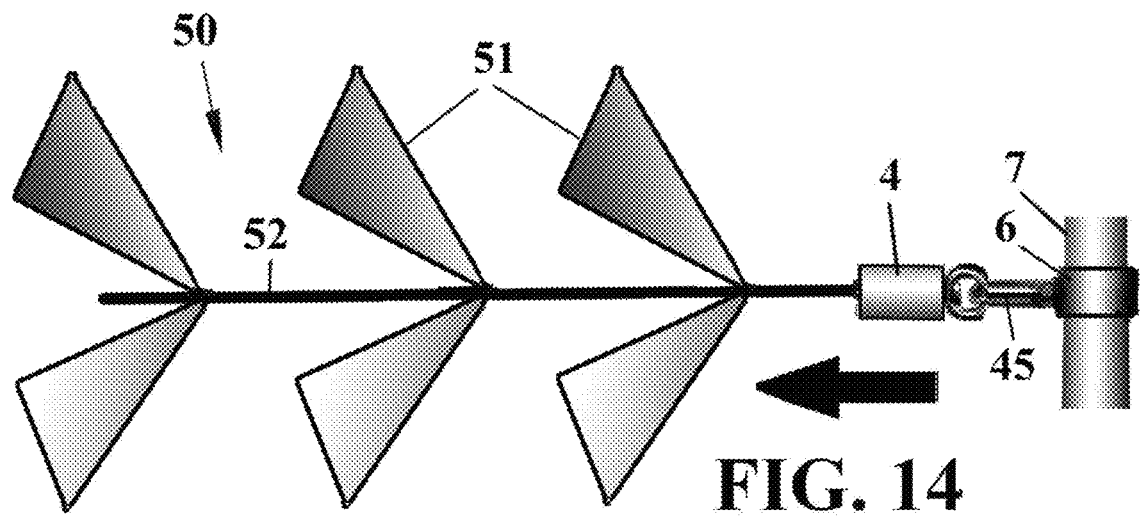
FIG. 14 shows a schematic and side view of a turbine variant with pairs of inclined triangular blades.

FIG. 14 shows the turbine (50) with pairs of inclined triangular blades (51), its axis (52). The generator is connected via the rod (45) to the collar (6) on the mast (7).

Figure 14A:
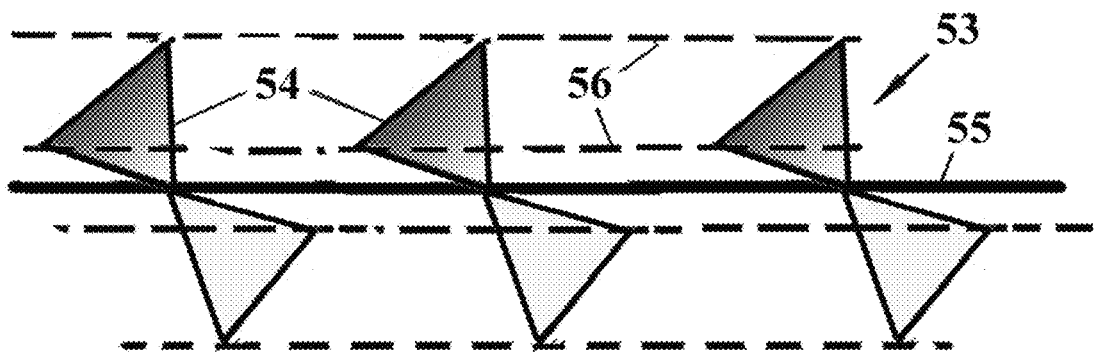
FIG. 14a shows a schematic and perspective view, variant of a turbine with pairs of triangular blades held to their vertices with cables.

FIG. 14a shows the turbine (53) with pairs of triangular blades (54) held to its vertices with cables. It rotates about its shaft (55).

Figure 15:
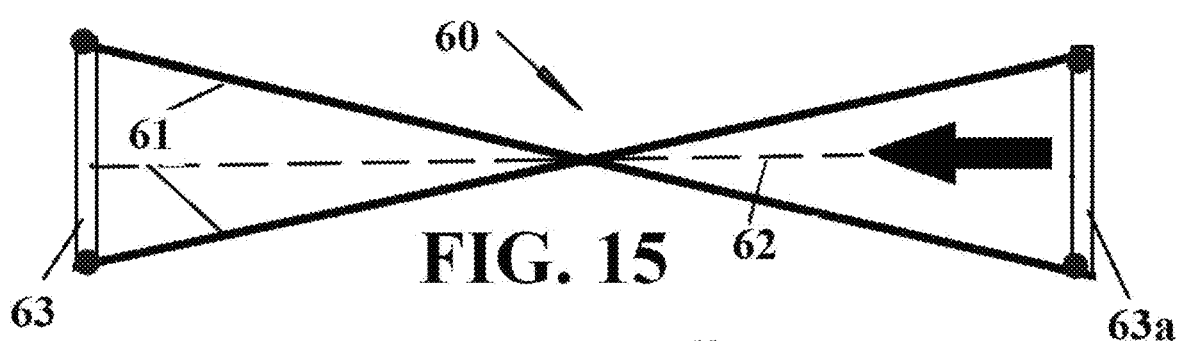
FIG. 15 shows a side and partial view, variant of a turbine formed by two blades inclined on both sides of the shaft.

FIG. 15 shows the turbine (60) formed by two inclined blades (61), one on each side of the axis of rotation (62), represented by the dashed line. Here the inclinations of both with respect to the fluidic current are shown. They are secured by the crank-shaped part (63 and 63a) one at each end. The (63a) is connected by cables or cords to the generator or to the mast.

Figure 15A:
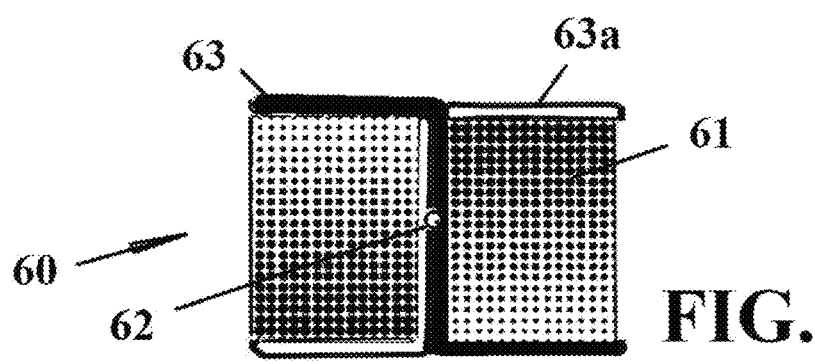
FIG. 15a shows a front view of the turbine of FIG. 15.

FIG. 15a shows the turbine (60) formed by two inclined blades (61) one on each side of the axis of rotation (62). They are secured by the crank-shaped part (63 and 63a) one at each end. One of them is connected by cables or cords to the generator or to the mast.

Figure 16:
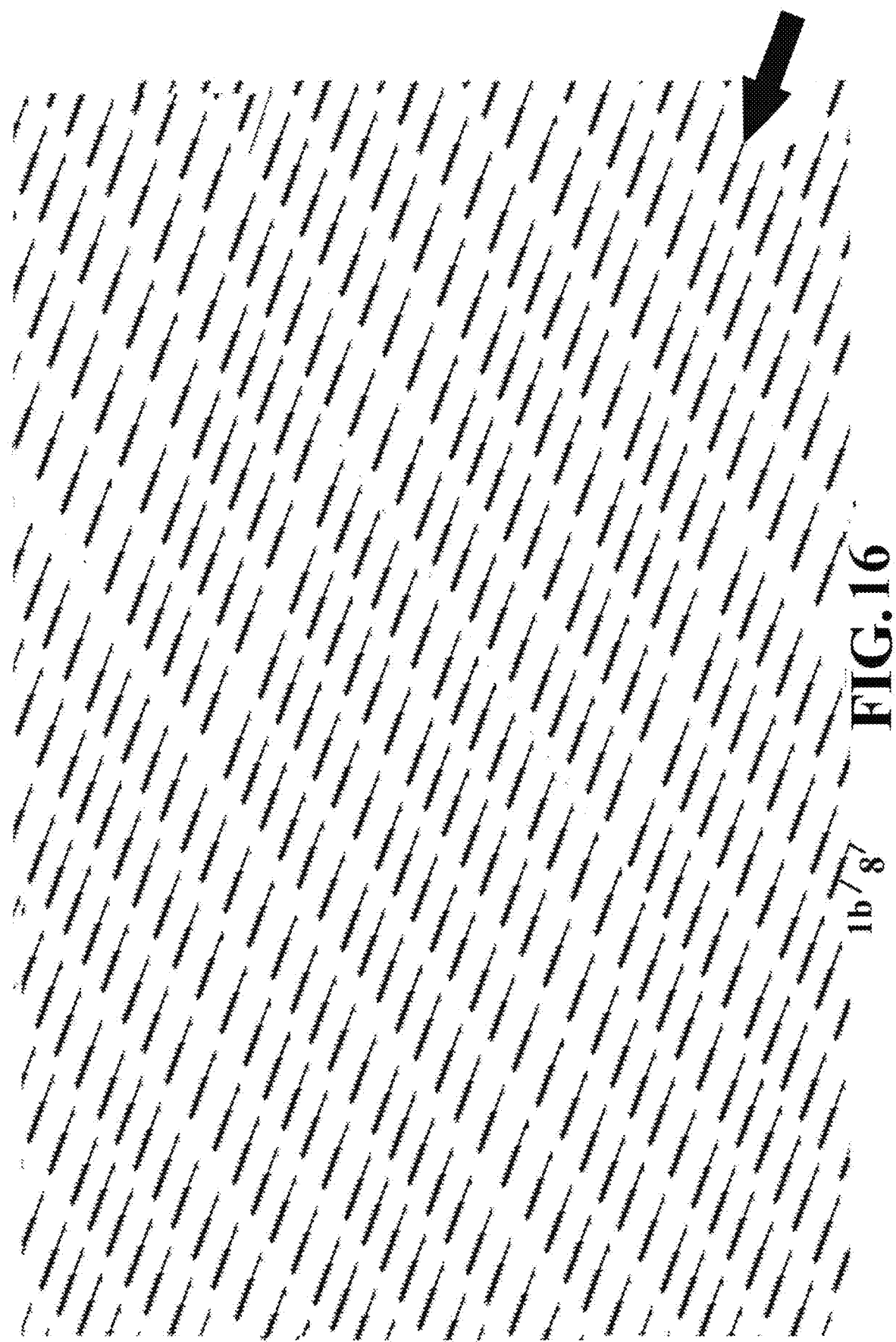

FIG. 16 shows a sea or land field or farm with multiple helical turbines (1b) fixed to the seabed or to the ground by the concrete blocks (8). The arrow indicates the direction of the fluid, which in this case is the same for all turbines.

FIG. 16a shows a maritime or terrestrial field or farm with multiple helical turbines (1b) fixed to the bottom by the cables (13s) placed between two points (8b) and (8c). The arrow indicates the direction of the fluid, which in this case is the same for all turbines. The cables can be the same that collect the electric current, having to interconnect between them to facilitate this task and to eliminate part of the cables.

Figure 17:
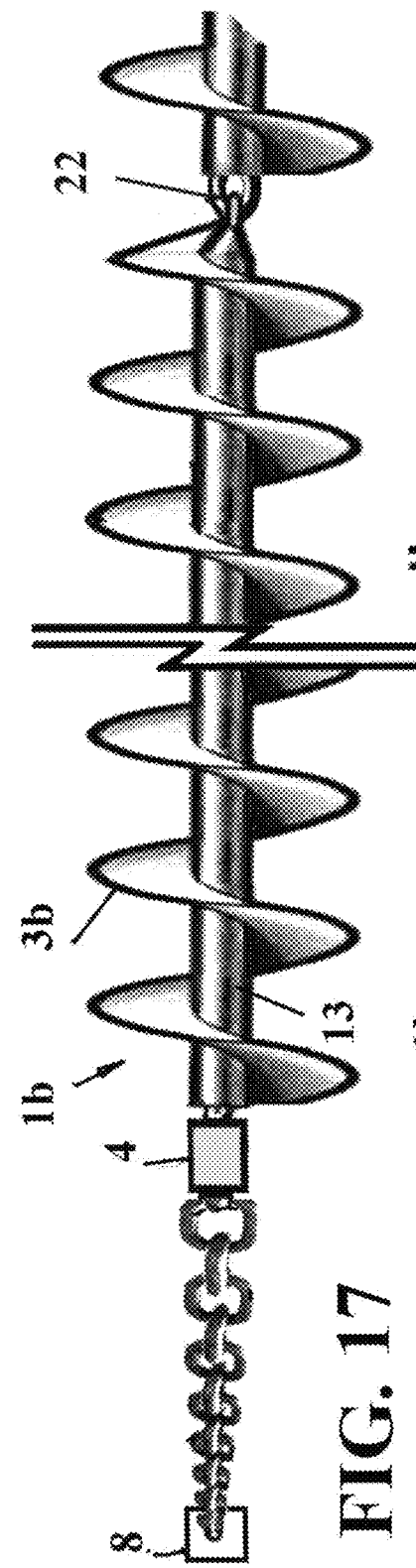
FIGS. 17 and 18 show schematic and partial views of two turbines with helical blades of different pitch and different number of blades.

FIG. 17 shows the turbine (1b) with a helical blade (3b) of constant dimensions, held to a cement block (8), which drives the generator (4) and is connected to other turbines in series by means of the hinge or rings (22).

Figure 18:
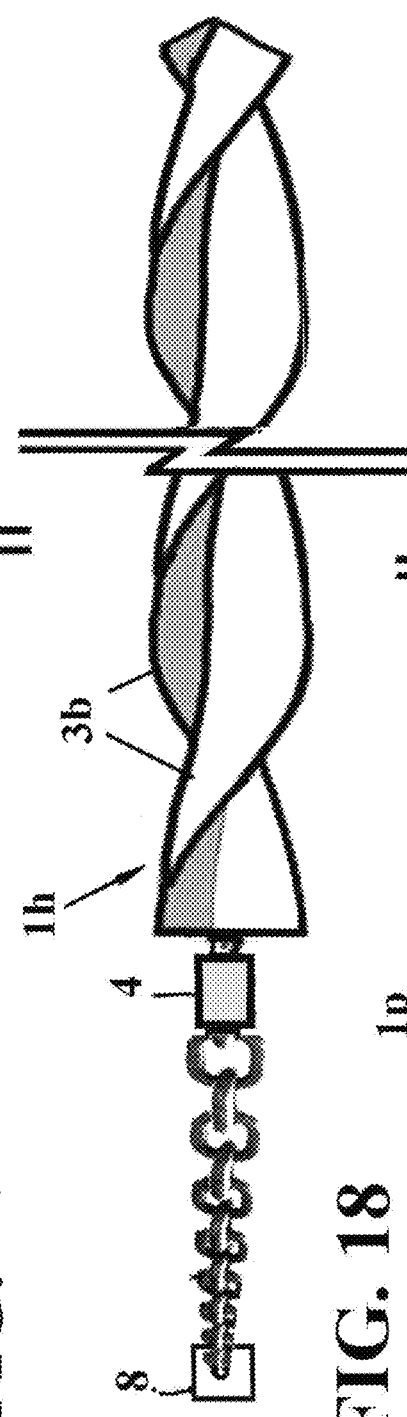

FIG. 18 shows the turbine (1h) with two helical blades (3b), attached to a cement block (8), which drives the generator (4).

Figure 19:
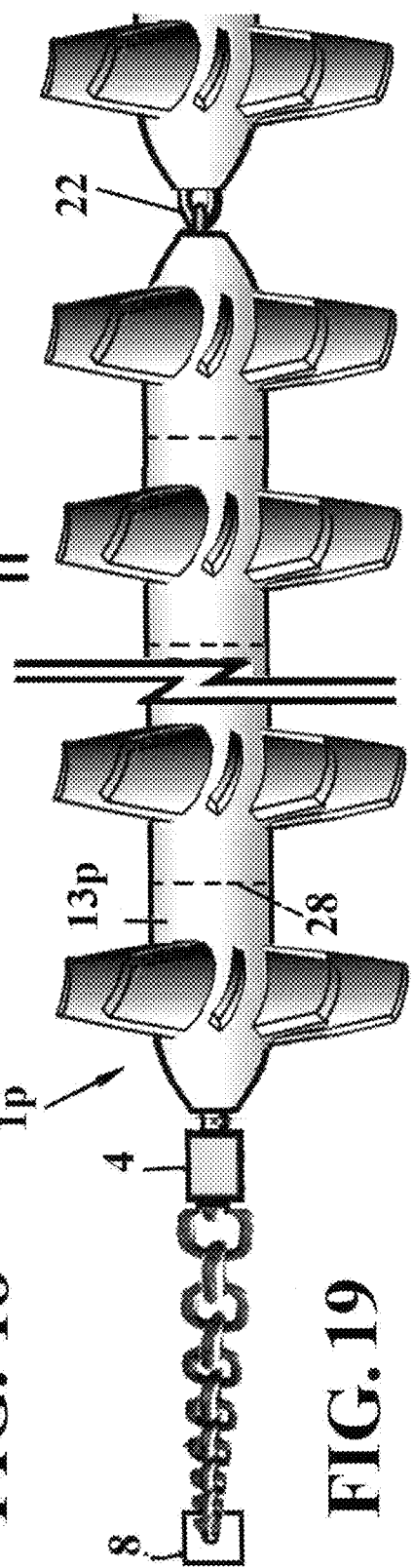
FIG. 19 shows a view of a turbine formed by several stages or paddle wheels.

FIG. 19 shows the turbine (1p) consisting of multiple stages or paddle wheels attached to a cement block (8) which drives the generator (4) and is connected to other turbines with the hinge or ring (22), where (28) is the connecting line of the different stages or wheels of pallets of the shaft (13p).

Figure 19A:
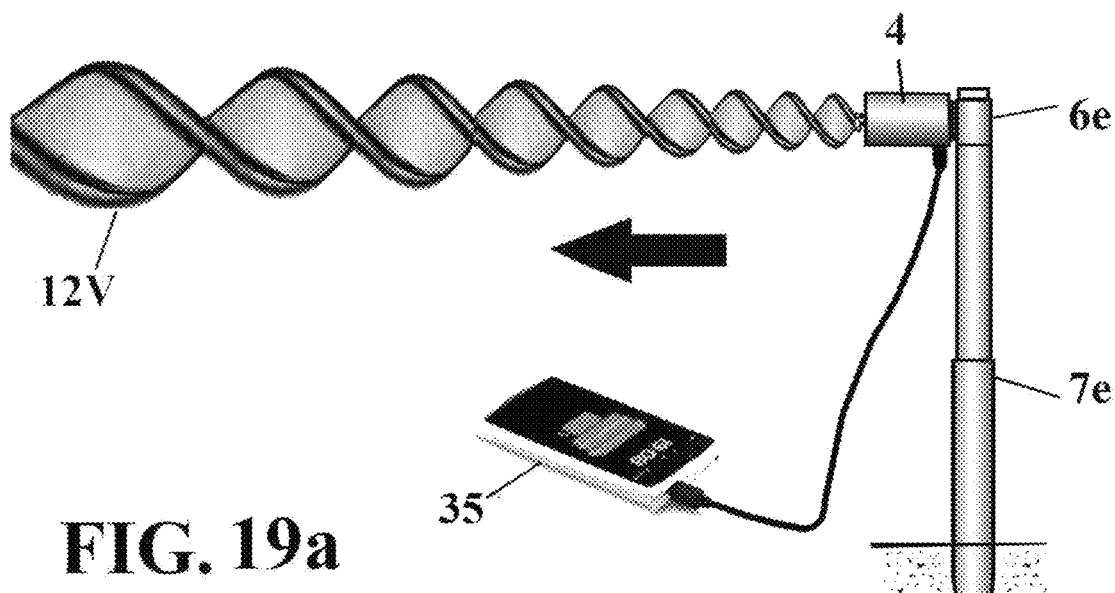
FIG. 19a shows a schematic view of a conical twisted-blade turbine application, feeding a mobile telephone.

FIG. 19a shows the turbine formed by the conical helical beam or strip (12v), held to the shaft of the generator (4) which feeds the mobile telephone 35. The generator is held to the rotatable collar (6e) and this in turn to the mast (7e).

Figure 20:
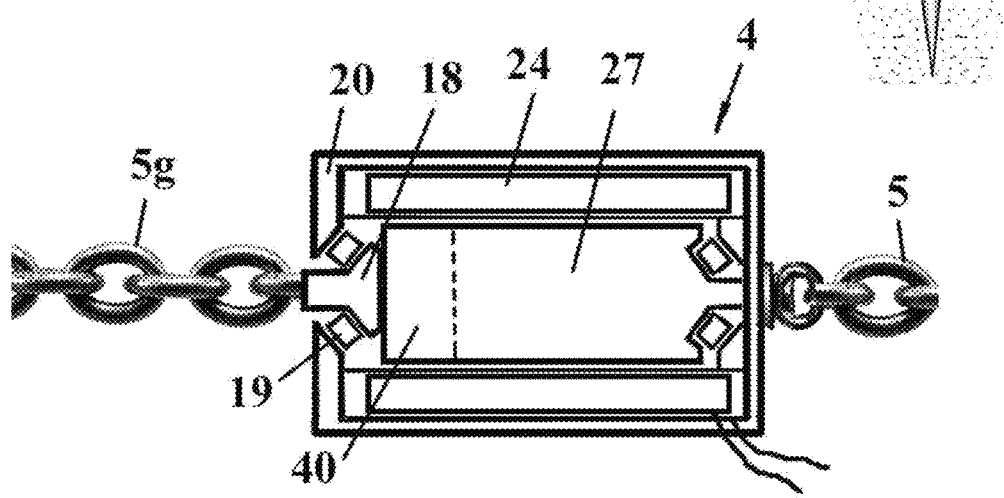
FIG. 20 shows a schematic and partially cross-section view of an electric generator and its cover.

FIG. 20 shows the generator (4), secured by the links (5) to a fixed point, within the housing (20), whose rotor (27) and shaft (18) rotates supported by the roller bearings (19) and by the chain (5g) which would be held to a turbine, (24) being the stator of the generator. The seals or gaskets that hold the internal elements of the generator are not shown. The rpm multiplier (40) is optional; it is used for very low speed turbines.

Figure 20A:
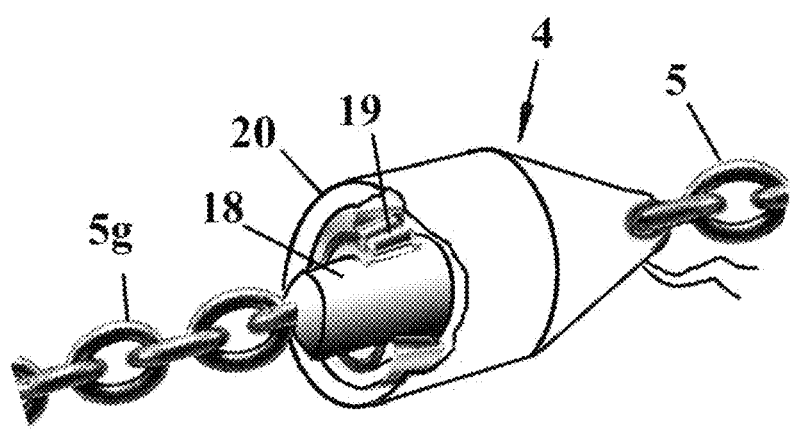
FIG. 20a shows a schematic and partially cross-section perspective view of a generator variant and its cover.

FIG. 20a shows the generator (4), secured by the links (5) to a fixed point, inside the housing (20), whose shaft (18) rotates supported by the roller bearings (19) and by the chain (5g) that would be held to a turbine. It is similar to that of FIG. 20.

The drawings show turbines, which through a changing the fluid used and densities can be valid for use in both water and air.

In all cases the size of the turbines are depicted proportionally relative to ships or whales to give an approximation as to their measurements. The thick arrow shows the direction of the currents.

The invention claimed is:

1. A fluid current energy capture system for capturing energy from a fluid comprising:

an axial turbine having an axis of rotation, said turbine having a free end, and a fixation end opposite said free end, said turbine having a helical blade for being driven by the fluid, said turbine having the helical blade has aerodynamic profiles having the dimensions of the turbines configured such that their blades are greater towards the free end;

said blade having two types of inclination for generating a torque and rotating said turbine about said axis of rotation, wherein first inclination comprises an inclination of a section of the helical blade with respect to said axis of rotation, wherein second inclination comprises an inclination of a section of the helical blade with respect to a plane perpendicular to the axis of rotation, wherein the first inclination is between 25° and 55° angles, and wherein the second inclination is between 0° and 45° angles;

a generator affixed to said fixation end, said generator generating power by rotation of said turbine driven by the fluid;

a mast, said generator being rotatably mounted to said mast for orientating said turbine in a flow stream of the fluid, said generator having a collar rotatably securing said turbine to said mast about a longitudinal axis of said mast, said generator rotatably mounted on a ring to the collar.

2. The system according to claim 1, wherein said turbine is constructed as a helix.

3. The system according to claim 1, wherein said free end is displaceable in a vertical direction to adjust an attitude of said turbine.

4. The system according to claim 1, further comprising a balloon disposed on said free end, said balloon being positively buoyant with respect to the fluid.

5. The system according to claim 1, wherein said mast has a strobe light to alert a presence of said mast.

6. The system according to claim 1, wherein said turbine has a hollow shaft that supports said blade, said shaft is buoyant with respect to the fluid to provide said turbine buoyancy in the fluid.

7. The system according to claim 1, wherein the turbines are half-cane thread coil springs.

8. The system according to claim 1, wherein the turbine is a helically twisted beam.

9. The system according to claim 1, wherein the turbine is a plurality of helical turbines.

10. The system according to claim 1, wherein the turbine is defined only by blades or vanes.

11. The system according to claim 1, wherein the turbine has a cavity filled with foam of plastic polymers, polyurethane, polyethylene or PVC, coated with a protective and resistant layer.

12. The system according to claim 1, wherein the turbine has a conical outer shape.

13. The system according to claim 1, wherein the turbine is attached to a ball socket, and an axis of the generator connected to the rotating end of the turbine by a pair of gears.

* * * * *